United States Patent [19]
Danly, Sr.

[11] Patent Number: 5,094,548
[45] Date of Patent: Mar. 10, 1992

[54] COMPOSITE AND SELF-LUBRICATING BUSHING

[75] Inventor: James C. Danly, Sr., River Forest, Ill.

[73] Assignee: Danly Corporation, Coconut Grove, Fla.

[21] Appl. No.: 554,791

[22] Filed: Jul. 16, 1990

Related U.S. Application Data

[63] Continuation-in-part of Ser. No. 307,848, Feb. 3, 1989, abandoned.

[51] Int. Cl.$^5$ .................... F16G 24/02; F16G 33/10
[52] U.S. Cl. .................................. 384/30; 384/13; 384/279; 384/286; 384/902
[58] Field of Search .......... 384/30, 276, 279, 286-293, 384/397, 415, 902, 13

[56] References Cited

U.S. PATENT DOCUMENTS

| | | | |
|---|---|---|---|
| 2,227,307 | 12/1940 | Hildabolt | 384/249 |
| 4,575,429 | 3/1986 | Jacobson | 252/12 |

FOREIGN PATENT DOCUMENTS

| | | | |
|---|---|---|---|
| 9661231 | 8/1988 | Fed. Rep. of Germany | |
| 988684 | 5/1951 | France | |
| 1016212 | 11/1952 | France | 384/902 |
| 1130227 | 9/1956 | France | |
| 1301752 | 7/1962 | France | |
| 2434301 | 3/1980 | France | |
| 2538278 | 6/1984 | France | |
| 677343 | 8/1952 | United Kingdom | 384/902 |

Primary Examiner—Thomas R. Hannon
Attorney, Agent, or Firm—Niro, Scavone, Haller & Niro

[57] ABSTRACT

A composite and self-lubricating bushing comprises a monolithic steel body having a machined internal cylindrical surface and a porous bearing layer applied to the surface. The porous bearing layer is formed by compacting and sintering a particulate bearing material. The steel body may also include a cavity for storing lubricant and at least one passageway extending between the cavity and the internal cylindrical surface. The bushing may be fabricated by positioning the steel body concentrically over an elastomeric plug, charging the annular cavity between the body and the plug with a sinterable particulate, expanding the elastomeric plug diametrically to compact the particulate, removing the plug and heating the bearing body and compacted particulate.

13 Claims, 2 Drawing Sheets

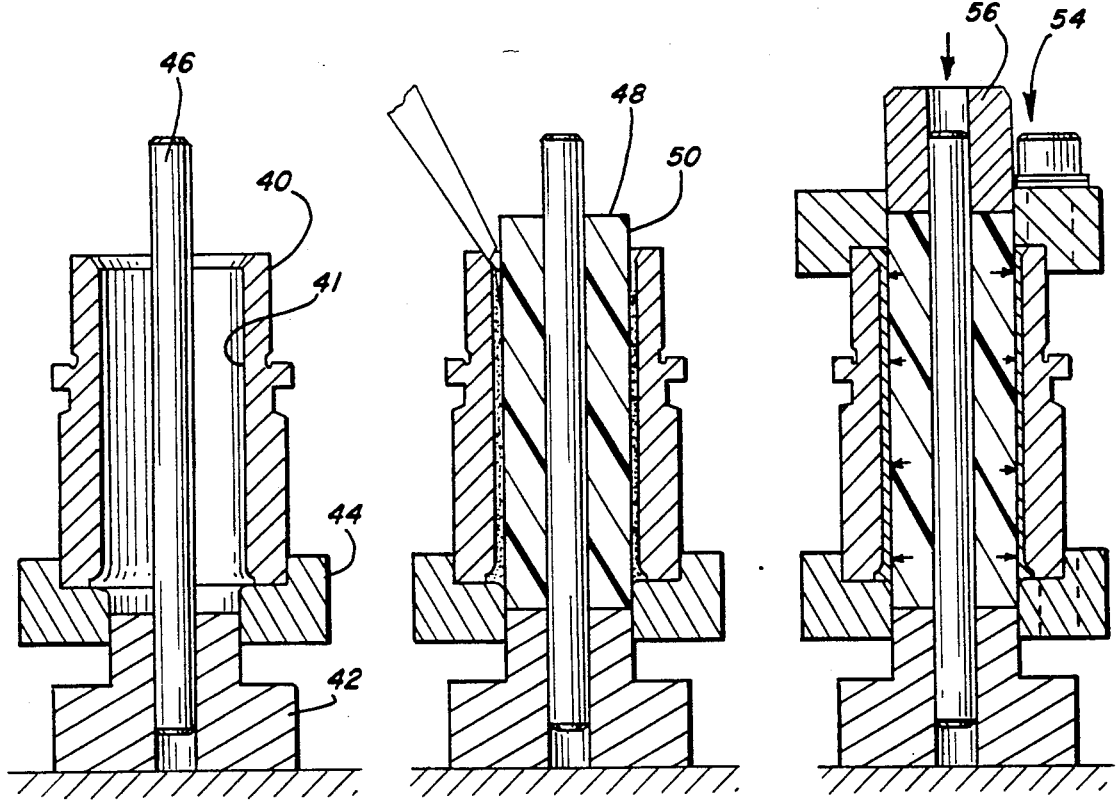
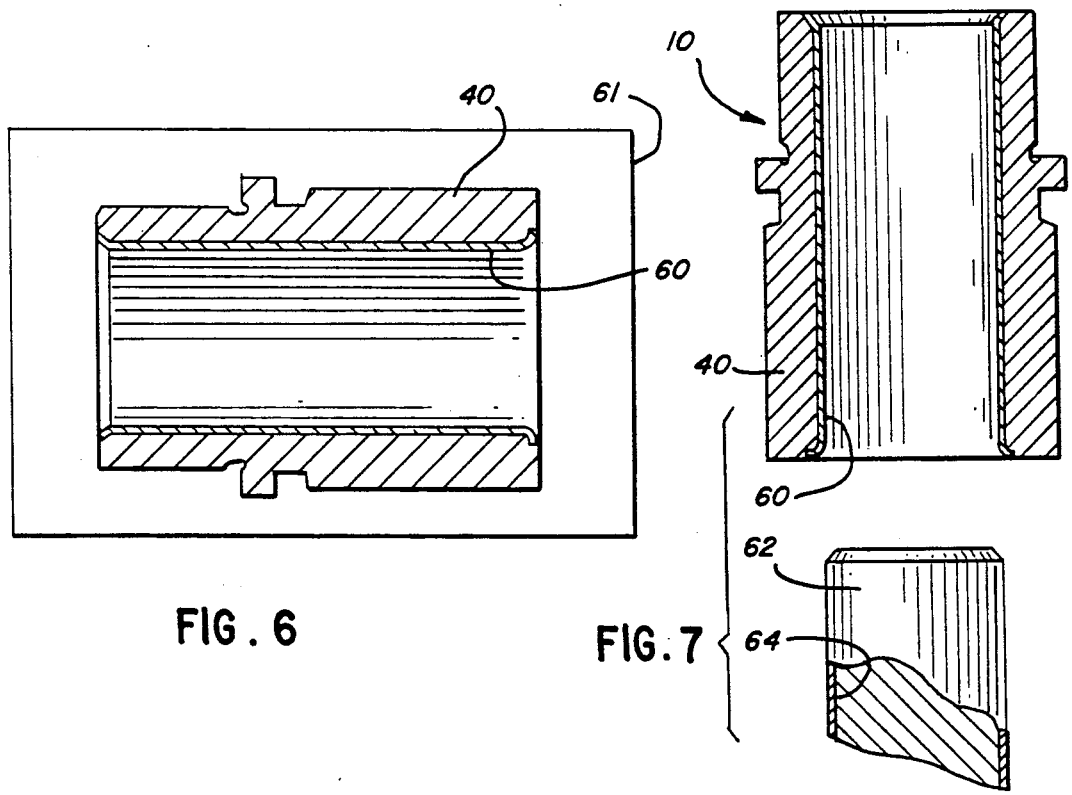

ic relates to bushings and, more particularly, to a composite and self-lubricating bushing # COMPOSITE AND SELF-LUBRICATING BUSHING This invention is a continuation-in-part of U.S. Ser. No. 07/307,848, filed on Feb.3, 1989 now abandoned.

BACKGROUND OF THE INVENTION

The present invention relates to bushings and, more particularly, to a composite and self-lubricating bushing for use in die sets, presses and other heavy duty machinery. The invention also relates to a method for the manufacture of a cylindrical bearing surface finding advantageous use in such a bushing.

It is well known in the tool and die industry that longlasting, precision bushings are an important component in the design of commercially acceptable die sets. Because these bushings are often subjected to high press velocities and substantial side thrust forces, it is necessary that they be formed from a monolithic block and that they be carefully constructed to exacting specifications. Two types of plain guide bushings are well known to the art and normally available from most die set manufacturers: hardened steel bushings and plated bushings in which a thin layer of bronze is plated in the bore of a steel bushing. In either case, the bushing is closely fitted to a hardened and ground guide post with a diametrical clearance ranging from about 0.0003 to 0.0008 inches. Blanking and piercing dies must be closely fitted to avoid shearing the cutting edges, while forming dies will work well with larger clearances.

Hardened steel bushings are widely used at present and, when properly lubricated and maintained in alignment, will provide excellent service and wear life at moderate press speeds. For applications with higher speeds or higher side loads, bronze plated bushings are preferred because they reduce chances of galling or seizing. These bronze plated bushings must also be lubricated regularly to avoid failure.

Some prior art dies, where greater pin and bushing clearance can be tolerated, may be fitted with solid bronze bushings inserted into the steel or iron body of the die. These bushings are more tolerant of dirt or fine metal particles which find their way into the space between the guide post and bushing and become embedded in the bronze. A plated bushing would have too thin a layer of bronze to accept anything but the finest of foreign particles and the hardened steel bushing would be even less tolerant. The disadvantages of solid bronze are lower mechanical strength, greater expense and a coefficient of expansion significantly greater than that of steel. Thus, as the bushing heats in service it tends to close in on the guide post adding to the heating problem. Sufficient clearance and lubrication must be provided to avoid this problem.

It is well known to provide all of these prior art bushings with means for lubrication, such as a lubricating fitting so that grease or other lubricants may be periodically introduced to the internal bearing surface. However, under high velocity and extreme load conditions such lubricants are quickly dissipated; and if the tool operator is not diligent in the proper and periodic application of lubricant, it is possible that a bushing may seize despite all of the foregoing design precautions. Thus, a need exists in the industry for a quality bushing for use in die sets and in other high load applications which is capable of self-lubrication for extended periods of service.

One of the important properties of bronze as a bearing material is its ability to conduct heat away from the bearing surface. For example, coefficients of heat transmission for bronze are about five times greater than steel. Therefore, a need exists for a bushing having a lining of bronze thick enough to conduct heat away but not so thick as to cause substantial reduction of the clearance between guide post and bushing, which can occur due to the fact that the heat expansion of bronze is 57% greater than that of steel.

Another well known bearing material is a porous sintered bronze which has the advantage of holding a lubricant in as much as 25% of its volume. However, most of the known prior art applications of such a sintered bronze have involved bearings fabricated from sheet stock. When formed into a bearing, the body of such bearings includes a separation line typically formed when the sheet stock is rolled into a cylindrical configuration. Thus, the resulting bushing is not a monolithic structure. Accordingly, these bearings are used only in commercial applications under conditions of moderate loads. They are not used as guiding elements in die sets, presses or other heavy machinery primarily because of the difficulty of achieving close, accurate fits.

It is also known in the prior art to introduce a sinterable particulate material into a bushing's annular cavity, and compact the particulate material against the inner surface of the bushing in situ by means of a rigid and tubular-shaped compacting punch which enters the space between a center plug and the interior die wall. This compaction is accomplished by insertion of the compacting punch into each end of the bushing. Such "end compaction" achieves poor results because the center portion of the porous bearing layer may be improperly compacted due to side wall friction between the particulate material and the annular cavity between the center plug and the interior die wall. Porous bearing layers in this state simply cannot be properly sintered and machined to a dimensionally uniform state, which state is required for proper die set use, and other similar applications. This problem is exacerbated in thin porous bearing layers used with bushings of substantial length, such as those used with die sets. For example, the inventor has experimentally verified that functional losses in a sleeve bushing compact having a wall thickness of 0.030 inches and a length of 3.00 inches are so great that 98% of the compacting pressure is lost at the center of the bushing, even when pressing from both ends. With such slight pressure applied at the center of the bushing, the integrity of the compacted layer is insufficient to maintain the physical structure of that porous bearing layer necessary for sintering purposes. Thus, the thin-walled porous bearing layers necessary for use in die set bushings cannot be obtained with known prior art.

SUMMARY OF THE INVENTION

The present invention is therefore directed to a novel composite bushing which employs a monolithic steel body and a compacted and sintered porous bearing layer which is formed on an internally machined cylindrical surface of the steel body.

The present invention is also directed to a novel and uniquely constructed bushing which overcomes the disadvantages associated with the prior art by incorporating into the bushing itself a means for lubricating the bushing's internal bearing surface over extended periods of service. Thus, the bushing of the present invention comprises a cylindrical body including an internal cylindrical bearing surface, a cavity or reservoir for storing a liquid or semi-liquid lubricant, at least one passageway extending between the cavity and the bearing surface to permit the flow of lubricant from the cavity to the bearing surface, and finally a cover or casing which is mounted to and over the bushing body to enclose the cavity.

In accordance with a preferred embodiment of the invention the bushing also includes one or more recesses extending along the internal bearing surface and in communication with the passageway from the lubricant reservoir. This recess facilitates distribution of the lubricant on the internal bearing surface. In addition, the bushing body may also include an externally accessible filling port which communicates with the lubricant reservoir within the bushing body. Finally, the self-lubricating bushing may also include an internal bearing surface having a porous layer, and preferably a porous layer impregnated with a solid polymeric lubricant.

In accordance with the method of the present invention the internal cylindrical surface of the bushing is provided through a unique sequence of process steps with a porous bearing layer. First, the cylindrical inner surface of the bearing body is thoroughly cleaned by means well known in the art (such as ultrasonic cleaning). Second, a cylindrical elastomeric plug is positioned concentrically within the bearing body so that the internal cylindrical surface of the bearing body and the plug together form an annular cavity. Next, a sinterable particulate material is charged or introduced into the annular cavity. Once the cavity is filled, the elastomeric plug is expanded diametrically. This expansion results in a compaction of the particulate material against the internal cylindrical surface of the bushing body. The elastomeric plug is then permitted to return to its unexpanded original diameter, and removed from the bearing body. Finally, the bearing body with the compacted particulate adhering to its internal surface is heated, thereby sintering the particulate and forming a porous bearing layer on the internal cylindrical surface of the bushing.

In accordance with a preferred embodiment of this method, the particulate is compacted by longitudinally compressing the elastomeric plug. The plug's longitudinal compression results in its concomitant diametric expansion, thereby compacting the particulate against the bushing's internal surface. This method of compaction is particularly well suited to bushings adapted for the particular application of die set use, to which the preferred embodiment of this invention is directed. In such bushings, the bore to which the sintered material is applied has a length many times greater, for example, thirty times greater, than the thickness of the sintered layer. The bearing layer of the present invention preferably has a thickness no greater than approximately 3% of the length of the bushing. In fact, in the particular application of die set use, the optimum bearing layer thickness, for bore lengths of 2–4 inches (lengths normal for die set use) has been found to be between 0.010 to 0.030 inches.

Accordingly, it is an object of the present invention to provide a composite bushing which is constructed from a monolithic steel body having a compacted and sintered bearing layer on its internally machined cylindrical surface, with such bearing layer having a thickness which bears a relation to the bore length.

Another object of the present invention is to provide a porous bearing layer in a steel housing which will provide strength, support and dimensional stability while the porous bearing layer provides for heat conductivity, and anti-seizing properties of a proper bearing material.

Another object of the present invention to provide a novel bushing construction which achieves an effective lubrication of the bushing's internal cylindrical surface over an extended period of service and without the need for frequent application of lubricating materials by the tool operator.

Still another object of the present invention is to provide a method for application of a porous bearing layer onto the internal cylindrical surface of a bushing which achieves a superior bearing layer quality and is cost effective.

BRIEF DESCRIPTION OF THE DRAWINGS

The novel features which are believed to be characteristic of the invention are set forth in the appended claims. The invention itself, however, together with further of its objects and attendant advantages, will be best understood by reference to the following description taken in connection with the accompanying drawings in which:

FIG. 3–6 illustrate the sequence of steps comprising the method of the present invention for the application of a porous bearing layer to the internal bearing surface of the bushing; and FIG. 7 is a cross-sectional view illustrating a bushing in exploded view relative to its associated guide post and in which the bushing includes a sintered bearing layer and the guide post includes a polymeric solid lubricant layer, which together provide a superior interface between the bushing and guide post.

DESCRIPTION OF THE PREFERRED EMBODIMENTS

Figure 1:
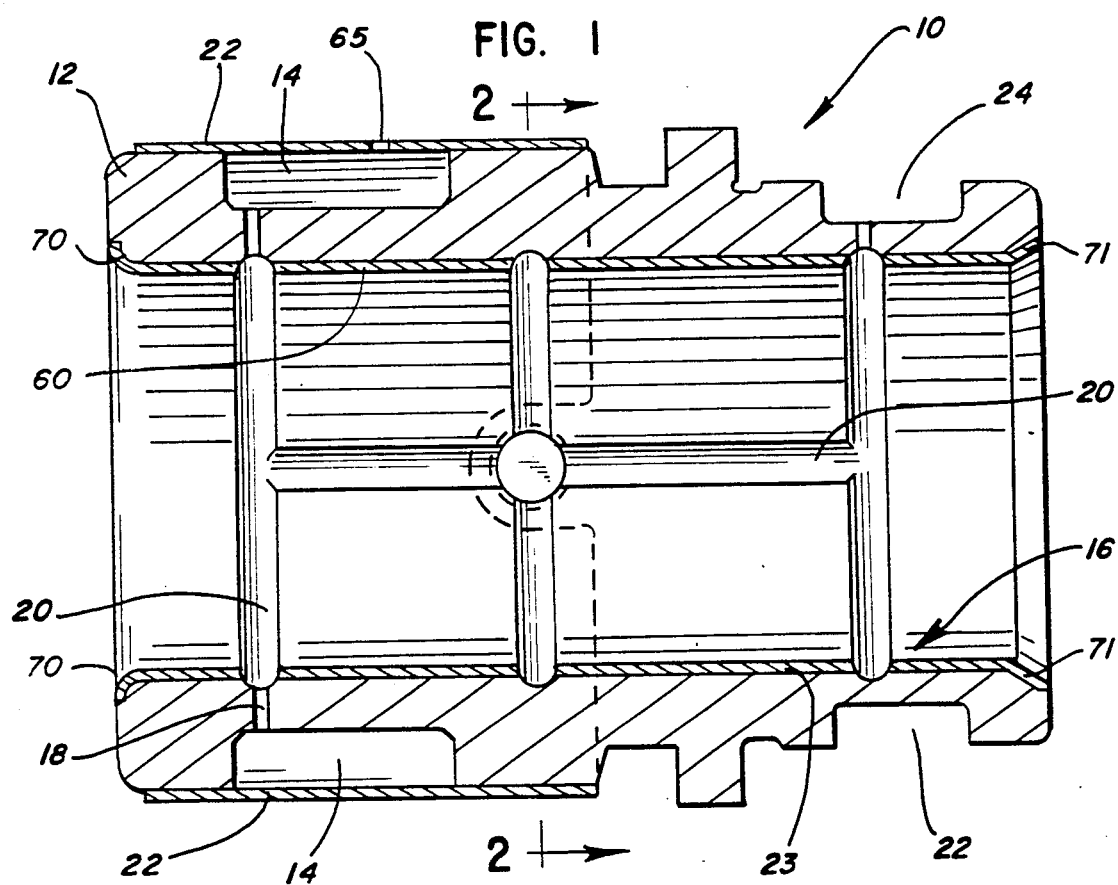
FIG. 1 is a cross-sectional view taken along the longitudinal center line of the bushing of the present invention.
Figure 2:
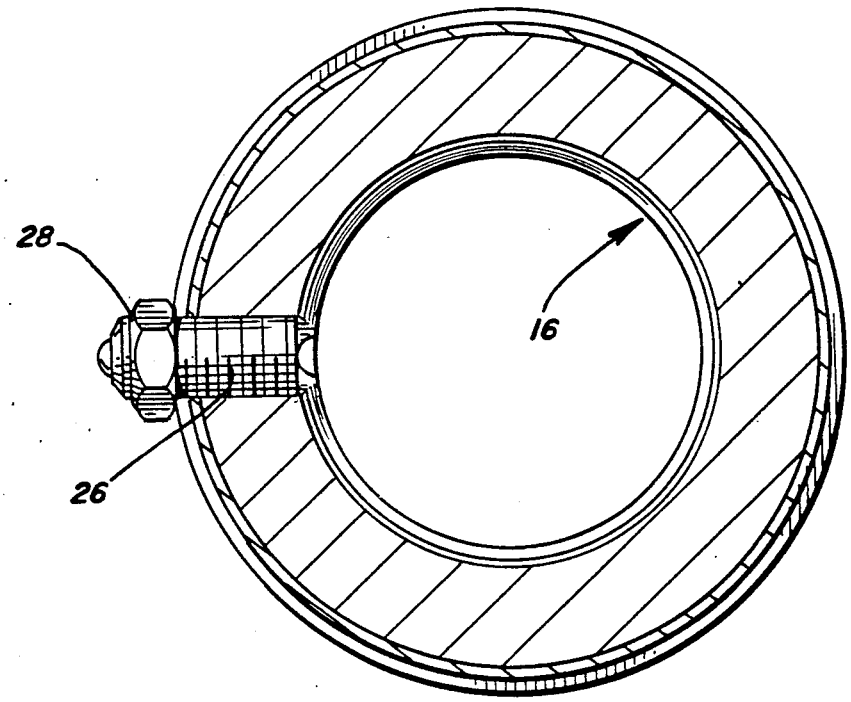
FIG. 2 is a cross-sectional view taken along line 2—2 of FIG. 1.

With reference now to FIGS. 1 and 2, the bushing of the present invention, designated generally as 10, is shown to include a monolithic body 12, a lubricant cavity or reservoir 14, an internal bearing surface 16, one or more internal passageways 18, at least one recess 20 in the bearing surface 16, and a cover 22 mounted to cylindrical body 12 in order to enclose the lubricant cavity 14.

The monolithic body 12 is preferably cylindrical and may be constructed from any one of a variety of materials well known to those of ordinary skill in the art. A particularly suitable material is steel. In accordance with one preferred embodiment of the invention, the machined cylindrical internal surface 16 supports a porous bearing layer 23 which is a compacted and sintered material, such as bronze, lead alloy, tin, tin alloy or other material well known to those of ordinary skill in the art. The internal surface 16 also includes one or more recesses 20 to facilitate the distribution of a lubricant. As illustrated in FIG. 1, the recesses 20 may be positioned circumferentially or axially or in a network of both. In addition, the recesses may be disposed in angular, "figure eight," spiral or helical arrangements.

The depth of the grooves formed by recesses 20 can be up to double the thickness of the sintered layer.

In accordance with an important objective of the present invention the cylindrical body 12 incorporates a lubricant cavity 14, and may optionally include one or more additional lubricant cavities, such as cavity 24 illustrated in FIG. 1. Cavity 14 communicates with the internal bearing surface 16 by means of one or more passageways 18. Thus, as lubricant is consumed during the service life of the bushing, the lubricant stored in cavity 14 will flow from cavity 14 through passageway 18 and along the recesses 20. In this way, the interface between internal bearing surface 16 and the external surface of the complementary guidepost along which the bearing moves will be effectively and continuously lubricated. Cavity 14 may be most economically constructed by machining an annular recess in the external surface of body 12 and thereafter enclosing the machined recess with a cylindrical cover or casing 22. The casing may be press fit or bonded to body 12 in such a manner as to prevent leakage of lubricant. A small orifice 65 is also formed in casing 22 to prevent entrapment of air and to permit free flow of lubricant from cavity 14 through passageway 18 to the bearing surface 16.

As shown most clearly in FIG. 2, the bushing 10 may also include an externally accessible filling port 26 having a conventional grease fitting 28. Filling port 26 is positioned in direct communication with one of the recesses 20 and through the network of recesses 20 and passageway 18 is in communication with cavity 14. Accordingly, the bushing may be refilled with lubricant simply by application of a conventional grease gun to grease fitting 28. The tool operator will be able to determine when cavity 14 is filled when excess lubricant begins to discharge from orifice 23.

The method of the present invention is depicted in its various steps in FIGS. 3-6. As shown in FIG. 3, a cylindrical bushing 40 is mounted in a suitable fixture including base 42, bushing mount 44 and a center pin 46. Next, an elastomeric plug 48 is located over pin 46 and positioned concentrically within bushing 40 thereby forming an annular cavity 47 between its external surface 50 and the internally machined cylindrical surface 41. The plug 48 is preferably constructed from a polyurethane elastomer and has a shore hardness of from about 80 to 120. Most preferably, the plug is properly positioned to form the annular cavity as just described, a sinterable particulate 52 is charged or introduced to the cavity by any of several means well known to those of ordinary skill in the art, such as an automated, self-vibrating "shaker box." The particulate material may also be any of a number of well known sinterable powders useful for such purposes. One such common bronze powder is composed of 90% by weight copper and 10% by weight tin. Of course, the precise composition of the particulate will depend upon the specific application in which the bearing or bushing is to be used.

Having filled cavity 47 with a suitable amount of sinterable particulate, the bushing and elastomeric plug are placed under a press 54. The press includes a center ram 56 which longitudinally compresses the elastomeric plug 48 thereby causing its diametric expansion toward the internal cylindrical surface 41 of the bushing 40. As a consequence of this diametric expansion, the particulate is compacted against the internal surface 41 to a prescribed density. When compaction of the particulate is complete the ram 56 is released thereby permitting the elastomeric plug 48 to return to its original length and diameter. The compaction achieved by this invention yields a generally uniform thickness of the compacted layer which, after sintering, allows the compacted layer to be machined to a precise, dimensionally uniform thickness. This precise layer thickness is important to successful and long-lasting bearing use as a guiding element in die sets and similar applications.

After removing the elastomeric plug from the bushing 40, the bushing together with its compacted particulate layer is placed in a suitable sintering oven 61 under conditions well known to those of ordinary skill in the art and is heated to a temperature necessary for sintering the particulate into a fused porous bearing layer 60. Preferably, the layer 60 has a thickness of about 0.010 to 0.030 inches. The resulting composite bushing exhibits all of the well-recognized advantages of machined steel bushings with the added advantages associated with a porous bearing layer on its internal bearing surface. This layer has a lower coefficient of friction than steel and has a greater porosity than prior art plated bushings such that lubricants are more readily retained at the internal bearing surface.

As shown in FIG. 1, porous bearing layer 60 has chamfered edges 70 and 71. These chamfer edges 1 ameliorate any guiding problems which may occur due to an inaccurate alignment of the guide post within the bushing. Thus these chamfer edges, constructed with a sintered layer, will help guide the post in place and prevent a "steel-on-steel" interaction. The die used when compacting from the ends with a single rigid punch, as taught in the prior art, must have the exact same diameter as the hole in the bushing—making impossible the use of chamfered edges. In order to achieve a larger diameter of bronze at the end of a bushing, the prior art's use of end compaction requires a "punch within a punch" (and thus two sleeves acting independently). However, the radial compaction of the present invention—with its utilization of the elastomeric plug which can expand into the chamfered area—achieves a compaction of the metallic powder (bronze in the case of die set use) in the area of the chamfered edges 1 and overcomes the problems inherent in such complicated die design.

Those skilled in the art will recognize that the bushing of the present invention provides an advantage over prior art bushings in that operator lubrication of the bushing is necessary much less frequently, in fact, on only an extended periodic basis. As a result, such lubrication may be performed during routine maintenance or changeover of the die set for a new job. Since lubrication will most likely not be required during the press run of a specific job, the likelihood of a bushing seizing during the service period is much less likely. Those skilled in the art will also recognize that the method of the present invention is extremely simple and permits the application of a sintered porous bearing layer to the bushing in a fast and cost-effective manner.

While particular embodiments of the invention have been described above, it will be obvious to those of skill in the art that changes and modifications may be made without departing from the invention in its broader aspects. Therefore, the object of the appended claims is to cover all such changes and modifications which fall within the true spirit and scope of the invention.

I claim:

1. A composite bushing for use in a die set, comprising:

a monolithic steel body having a machined internal cylindrical surface; and a porous bearing layer on said internal cylindrical surface, said bearing layer including a particulate material which is first compacted and then sintered in situ on said internal cylindrical surface and having a thickness of no greater than approximately 0.120 inches.

2. The composite bushing of claim 1 wherein said particulate material is a bronze powder.

3. The composite bushing of claim 2 wherein said bronze powder comprises 90% by weight copper and 10% by weight tin.

4. The composite bushing of claim 1 wherein said particulate material is selected from the group consisting of a bronze powder, a lead alloy powder, a tin powder or a tin alloy powder.

5. The composite bushing of claim 1 wherein said porous bearing layer is impregnated with a solid polymeric lubricant.

6. The composite bushing of claim 1 further comprising a cavity in said steel body for storing lubricant, at least one passageway through said porous bearing layer and communicating with said cavity to permit the flow of lubricant from said cavity to said bearing layer and the interior of said bushing, and a cover mounted to said steel body to enclose said cavity.

7. The bushing of claim 6 further comprising at least one recess on said bearing layer, said recess being aligned with said one passageway to facilitate distribution of said lubricant on said bearing layer.

8. The bushing of claim 7 wherein said body also includes an externally accessible filling port in communication with said recess whereby lubricant may be charged into said cavity through said port, said recess and said passageway.

9. The composite bushing of claim 1 wherein said thickness of said bearing layer is between 0.010 and 0.030 inches.

10. The composite bushing of claim 1, wherein said bearing layer has a thickness of no greater than approximately 0.090 inches.

11. The composite bushing of claim 1, wherein said bearing layer has a thickness of no greater than approximately 0.060 inches.

12. The composite bushing of claim 1, wherein said porous bearing layer includes one or more chamfered edges.

13. The composite bushing of claim 1, wherein said internal cylindrical surface includes chamfered edges, and said porous bearing layer is applied over said chamfered edges.

* * * * *